July 9, 1957    H. J. LINGAL ET AL    2,798,922
CIRCUIT INTERRUPTERS
Original Filed July 19, 1951    4 Sheets-Sheet 1
Fig. 1.
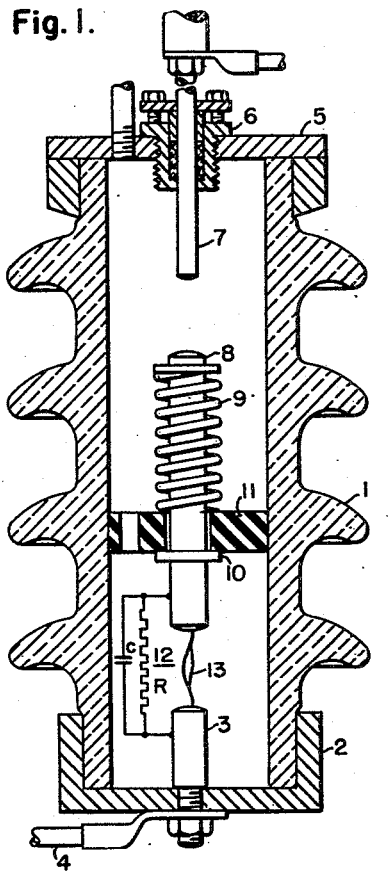
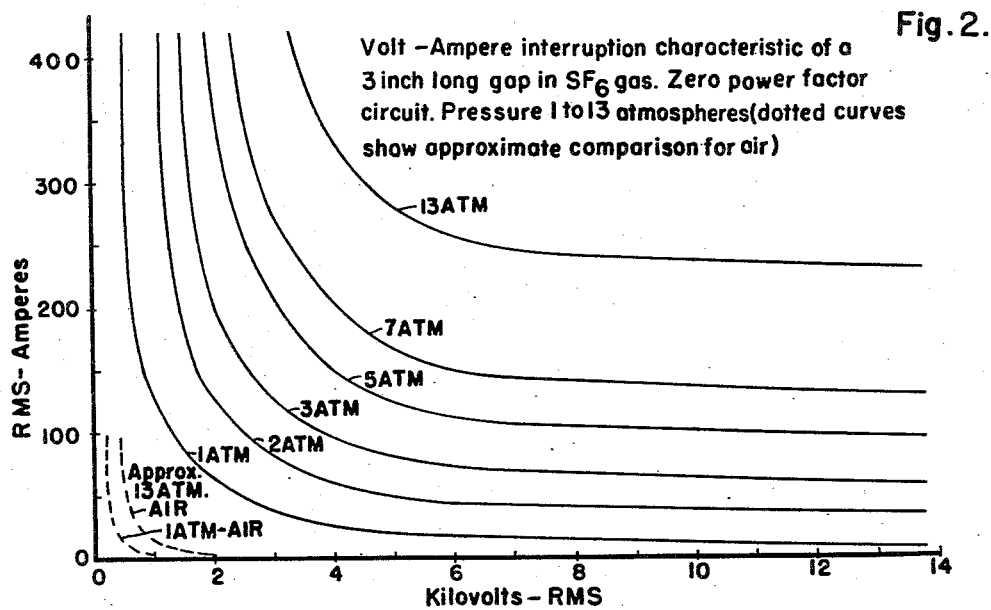
Fig. 2.
Volt–Ampere interruption characteristic of a 3 inch long gap in $SF_6$ gas. Zero power factor circuit. Pressure 1 to 13 atmospheres (dotted curves show approximate comparison for air)

United States Patent Office 2,798,922
Patented July 9, 1957

2,798,922

CIRCUIT INTERRUPTERS

Harry J. Lingal, Thomas E. Browne, Jr., and Albert P. Strom, Pittsburgh, Pa., assignors to Westinghouse Electric Corporation, East Pittsburgh, Pa., a corporation of Pennsylvania Original application July 19, 1951, Serial No. 237,502, now Patent No. 2,757,261, dated July 31, 1956. Divided and this application May 10, 1956, Serial No. 584,133

10 Claims. (Cl. 200—148)

This invention relates to circuit interrupters in general and, more particularly, to improved arc-extinguishing structures therefor.

This application is a division of applicants' parent application filed July 19, 1951, Serial No. 237,502, now Patent No. 2,757,261, dated July 31, 1956, and assigned to the assignee of the instant application.

A general object of our invention is to provide a circuit interrupter embodying sulfur hexafluoride gas, and utilizing impedance means shunting one of the arcs, whereby vastly improved interrupting performance is obtained.

The use of sulfur hexafluoride ($SF_6$) gas merely as an insulating medium has been known for some time. Refer, for example, to U. S. Patent 2,221,671, issued November 12, 1940 to Franklin S. Cooper. This patent discloses the use of sulfur hexafluoride gas as a dielectric medium in electrical equipment relying essentially on the dielectric strength of the sulfur hexafluoride.

Those skilled in the art know that there is little correlation between the dielectric strength of a gas and its ability to extinguish electrical arcs. For example, hydrogen has approximately half the dielectric strength of air but hydrogen gas will interrupt electrical arcs of several times the amperage that air will under the same test conditions. We have discovered hitherto unknown and phenomenal arc interrupting and extinguishing properties of sulfur hexafluoride. These properties are not apparent from or suggested by any facts previously known with regard to sulfur hexafluoride.

The present invention is not primarily concerned with the use of sulfur hexafluoride as a dielectric gas in electrical equipment functioning essentially to insulate conducting parts at different potentials, but the invention is based on the utilization of the circuit interrupting properties of sulfur hexafluoride gas which we have found to be truly phenomenal. We have discovered, for example, that in plain break switch devices (that is, switches functioning with a simple separation of a pair of abutting contacts disposed in a gas chamber) for a three inch long gap between the contacts in relatively still sulfur hexafluoride, that the arc-interrupting capacity of the switch in the sulfur hexafluoride gas was of the order of 100 times as great as with air.

Furthermore, we have discovered even greater arc interrupting effectiveness of sulfur hexafluoride when it is blown through an electrical arc developed in operation of a circuit interrupter. For example, by employing a device utilizing, for instance, a piston to obtain forced gas flow of sulfur hexafluoride through the arc, we obtain of the order of 200 times greater interrupting performance than in still sulfur hexafluoride.

It is known to use insulating orifices of organic materials, such as horn fiber, which give off decomposition gases on being subjected to arcing and such fiber orifices have been found superior to either metallic orifices or to refractory orifices in many types of air blast breakers.

However, in making interruption tests in gases containing fluorine, such as sulfur hexafluoride, these organic material orifices have been found to be unsatisfactory because hydrogen is one of the decomposition products liberated from the organic orifice material during exposure to an arc, and this hydrogen combines with the free fluorine, which is also liberated momentarily from the sulfur hexafluoride gas, to form lasting highly corrosive acids. These corrosive acids will, of course, attack the materials in the breaker. Barriers and other members subjecting to arcing will behave similarly.

We have discovered a solution to this difficulty by using polytetrafluoroethylene or polychlorotrifluoroethylene orifices in interrupters embodying sulfur hexafluoride as the arc-interrupting gas. From such polytetrafluoroethylene orifices, fluoro-carbon gas can be liberated, and this does not form corrosive acids with the arc products of the sulfur hexafluoride.

Further objects and advantages of the invention will become more apparent upon reading the following specification taken in conjunction with the drawings, in which:

Figure 1 illustrates a circuit interrupter establishing two serially connected arcs with one of the arcs being shunted to lower the rate of rise of the recovery voltage, and thereby enable the circuit to be more easily interrupted at the other serially connected break;

Fig. 2 is a graph showing the volt-ampere interruption characteristics of a three-inch long gap in still sulfur hexafluoride gas at zero power factor, at different absolute pressures of the gas. The graph also shows a plain break interruption characteristic in still air at 1 and 13 atmospheres absolute pressure;

Figure 3:
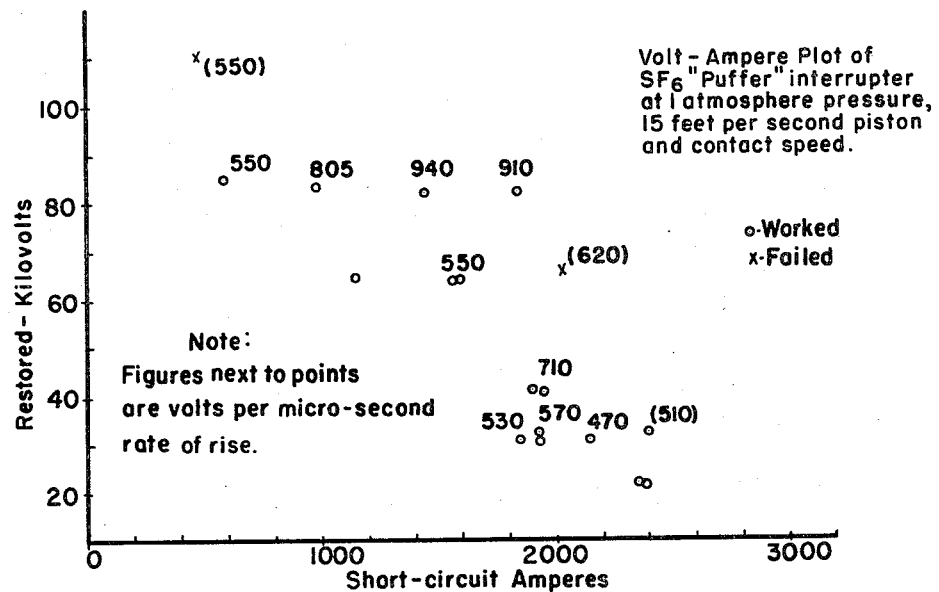
Figure 4:
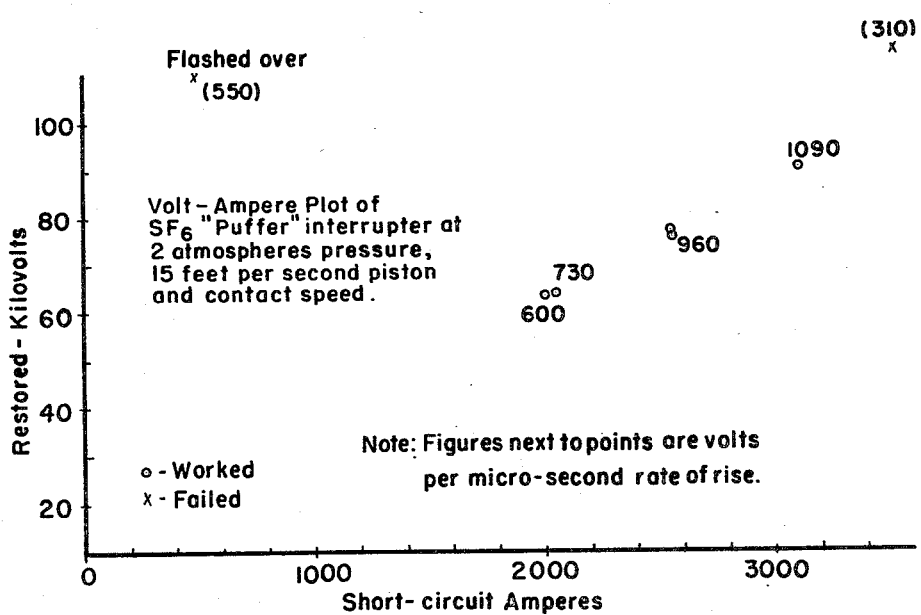
Figure 5:
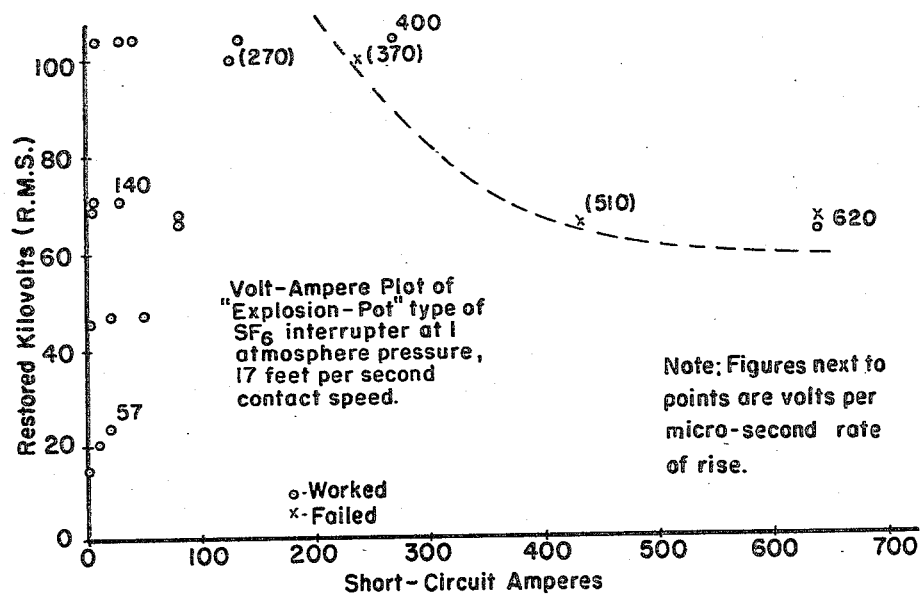
Figure 6:
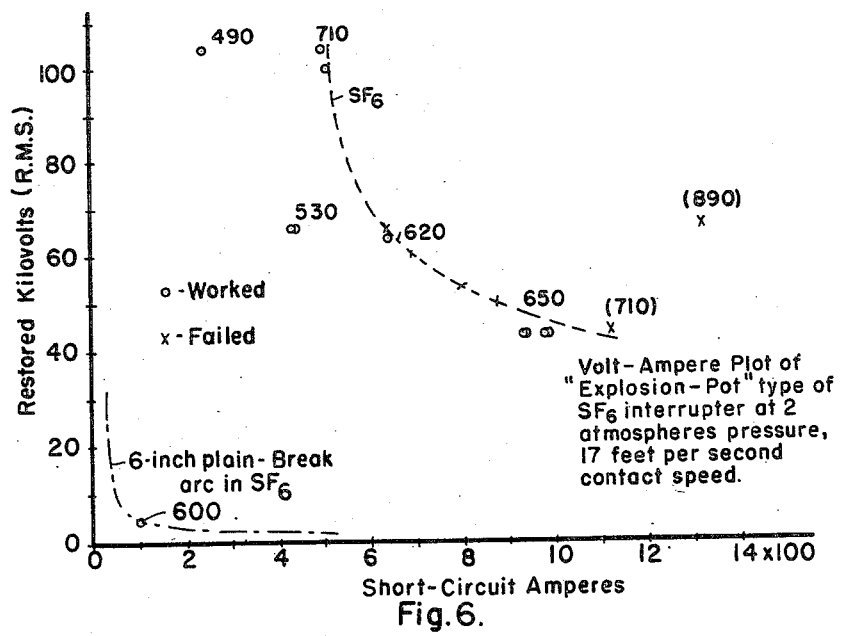
Figure 7:
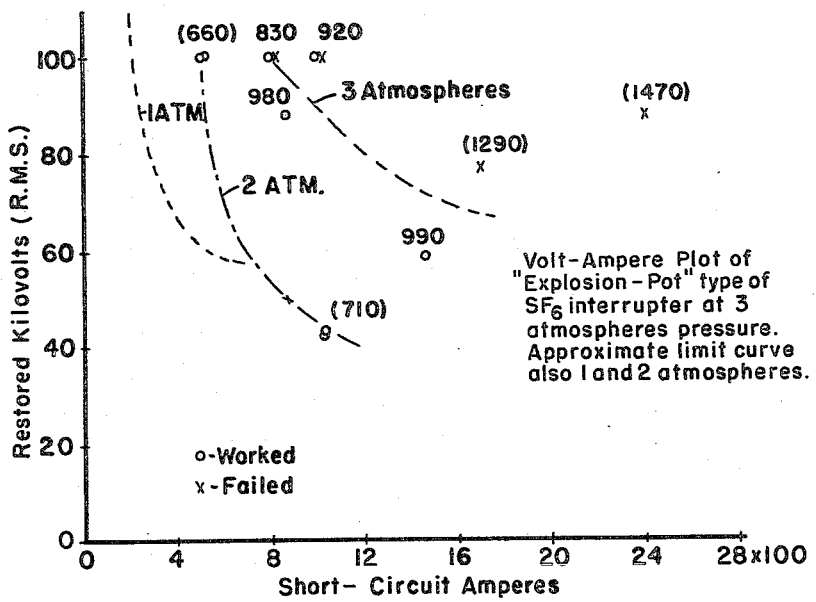
Figure 8:
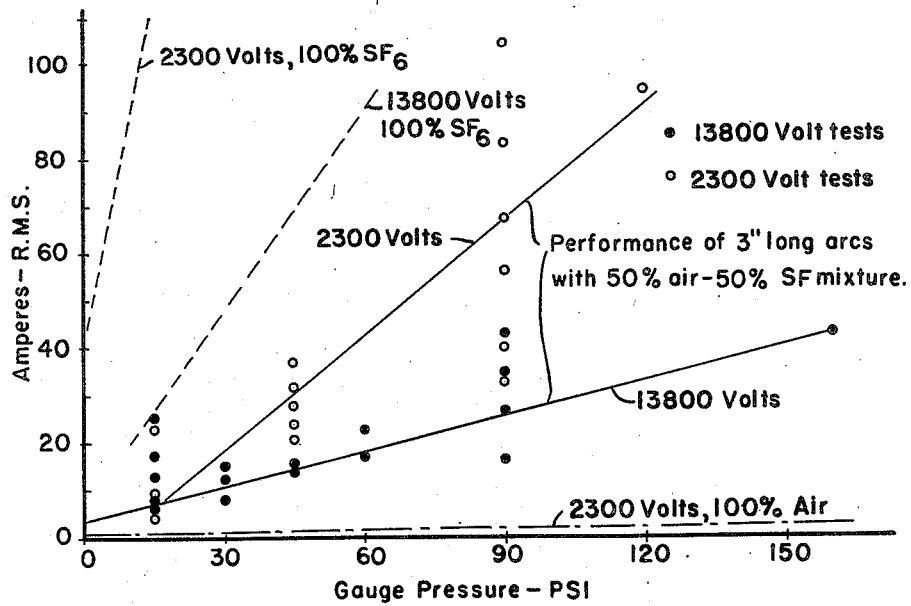

Fig. 3 is a plot of the interrupting points relating restored kilovolts (R. M. S.) to short-circuit amperes for a "puffer" type of interrupter, with the sulfur hexafluoride gas at atmopheric pressure and with the piston and contact separation speed of approximately 15 feet per second; the figures next to the points being volts per microsecond rates of rise of the recovery voltage transient;

Fig. 4 is a plot similar to the plot of Fig. 3 for the same interrupter, but with the sulfur hexafluoride being at two atmospheres pressure instead of one;

Fig. 5 is a graph showing the performance of an "explsion-pot" type of interrupter provided with sulfur hexafluoride gas at one atmosphere pressure;

Fig. 6 is a graph showing the interrupting performance of an "explosion-pot" type of interrupter with the sulfur hexafluoride gas maintained therein at two atmospheres pressure;

Fig. 7 is a graph showing the interrupting performance of an "explosion-pot" type of interrupter using sulfur hexafluoride gas at various pressures; and Fig. 8 is a graph plotting points and curves from tests of a given interrupter using: (1) a mixture of still gas composed of 50% air and 50% sulfur hexafluoride, at two different voltages; (2) a still gas composed of 100% surfur hexafluoride at two different voltages; and (3) a still gas composed of 100% air at 2,300 volts. The graph plots the interrupting performance in terms of current being interrupted against the gauge pressure in pounds per square inch of the gas used.

As indicated hereinabove, we have discovered previously unknown and completely unexpected arc-interrupting properties of sulfur hexafluoride gas. We have applied sulfur hexafluoride gas to a variety of circuit interrupters to take advantage of our discovery and thereby have been able to operate the interrupters successfully far beyond any previously established maximum service condition therefor. The application of sulfur hexafluoride in circiut interrupters in accordance with this invention promises to change present concepts of circuit interruption as to circuit interrupting performance, size of apparatus to handle given electrical current, and the construction of circuit interrupter structures.

More specifically, we have discovered that sulfur hexafluoride gas may be used with outstanding and hitherto unrealizable results in many different classes of circuit interrupting devices. For example, this unusual gas with its remarkable interrupting ability may be used in lightning arresters as an interrupting medium between the several gap elements, and in circuit interrupters of the type either utilizing a forced gas flow or employing magnetic means to effect arc lengthening. Moreover, the sulfur hexafluoride gas may be used in types of circuit interrupting equipment employing two or more breaks in series to increase the voltage interrupting ability, one break being utilized for generating pressure in the gas to effect gas flow at the other break; or one of the two serially related breaks may be shunted by impedance means to effect a lowering of the rate of rise of the recovery voltage transient, thereby enabling circuit interruption to take place more easily at this gap, and subsequently at the other serially connected gap.

We are able to increase the interrupting ability of arcs in sulfur hexafluoride still further by impedance shunting. Since the recovery rate of the arc in sulfur hexafluoride is 100 times or more than in air, only relatively small shunts are required. It thus becomes feasible to produce breakers in which during operation there result two or more arcs in series, at least one arc of which is shunted, and thereby we are able to interrupt very heavy currents at high voltages.

Illustrative of this feature is the interrupter of Fig. 1 showing an interrupter having a porcelain casing 1, to which is affixed a lower end cap 2 carrying a stationary contact 3. Externally of the cap 2, a line connection 4 is fastened to the stationary contact 3. The upper end of the casing 1 is provided with a closure 5 having a bushing 6, through which a movable contact 7 passes. The movable contact 7 makes abutting engagement with an intermediate contact 8, the latter being biased upwardly in an opening direction away from the stationary contact 3 by a compression spring 9. The intermediate contact 8 is provided with a stop flange portion 10, which strikes an apertured plate 11 during the opening operation. The entire casing 1 is filled with sulfur hexafluoride gas.

Shunting the stationary and intermediate contacts 3, 8 is impedance means, generally designated by the reference numeral 12, and in this instance comprising a resistance R and a parallel-connected capacitance C. During the opening operation the impedance means 12 facilitates the extinction of the arc 13, drawn between the contacts 3, 8 in known manner. The residual current passing through the impedance means 12 following extinction of the arc 13 is readily interrupted by the sulfur hexafluoride gas present in the casing 1, upon the separation of the movable contact 7 from the intermediate contact 8. Thus, Fig. 1 is an illustration of an interrupter provided with sulfur hexafluoride cooperating to produce improved functioning with two sequential breaks in series, with the first break being shunted by impedance means 12 to facilitate the interruption of the arc 13 and to improve the power factor of the circuit being interrupted.

Since some free fluorine may be temporarily liberated from the sulfur hexafluoride gas during the interrupting operations, it is not desirable to use insulating orifices or other parts adjacent the arc of organic materials such as horn fiber. Hydrogen, evolved from the fiber during arcing, will react with the free fluorine to produce highly reactive hydrogen fluoride acids. We have discovered a solution to the difficulty of preventing the formation of corrosive hydrogen fluoride acids by employing insulation composed of either polytetrafluoroethylene or polymonochlorotrifluoroethylene. These fluorinated polymer materials have been found suitable for orifice materials, and arc barriers to protect the main body of the organic insulating material from the heat of the arc.

Accordingly, the insulation to be exposed to the arcs in circuit interrupters embodying sulfur hexafluoride is preferably composed entirely of, or surfaced with, a solid polymer selected from the group consisting of polytetrafluoroethylene and polychlorotrifluoroethylene. The polymers have the unit formula

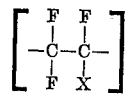

where X represents a halogen selcted from the group consisting of chlorine and fluorine.

We have discovered that the results obtained using sulfur hexafluoride gas as an arc interrupting medium in circuit interrupters are phenomenal. We have found that sulfur hexafluoride gas, in tests of a plain break, three inch long gap at contant voltage is in the order of 100 times as effective as air in extinguishing electrical arcs. It was further discovered that arcs in sulfur hexafluoride would interrupt at rates of restored voltage rise of at least 100 times the limiting values for interruption of arcs in air. It was also observed that on the same voltage circuits, about 100 times as much current could be interrupted in sulfur hexafluoride as in air. These are very surprising results, not at all indicated by the slight differences in dielectric strength of the sulfur hexafluoride gas over air. If surfur hexafluoride only exhibited better arc interrupting properties, compared to air, in proportion to its dielectric strength difference over air, it would not be of interest for use in commercial circuit interrupters, because the added complication of hermetically sealed enclosures and other factors would counterbalance any slight advantages it would have had over air breakers.

Our discovery of the unexpected arc-interrupting properties of sulfur hexafluoride has enabled the making of simple, rugged, totally enclosed circuit interrupters many times smaller than previously available complicated air or oil switches. Circuit interrupters produced in accordance with the present invention are opening new fields of application for circuit interrupters. For example, small load-break disconnecting switches made in accordance with the invention will replace oil-break circuit interrupters. Due to the small size and lower cost for a given rating, the invention will greatly affect the design and construction of substations and other electrical distribution systems.

Another unexpected property we have discovered is that whereas the arc interrupting ability of air increases slightly with arc or gap length between contacts, in sulfur hexafluoride the arc interrupting ability for gaps of one inch and more is almost directly proportional to gap length. This makes it readily possible to improve further the interruption in sulfur hexafluoride, as compared to air, by the simple expedient of elongating the arcs in sulfur hexafluoride by magnetic or other means.

Still another unexpected property we have discovered is that the current or voltage interrupting ability of plain break arcs in sulfur hexafluoride gas increases almost directly with the absolute pressure, whereas in air the arc interrupting properties improve only slightly with increase in pressure. Hence, either the current or the voltage interrupting limit of a plain break arc in sulfur hexafluoride can be multiplied by a factor of, say 10, by simply increasing the pressure of the sulfur hexafluoride in the switch chamber from 1 to 10 atmospheres.

Over and beyond the hundred-fold arc-interrupting superiority of sulfur hexafluoride to air in a plain break interrupter, we have found that an astonishing further increase in arc-interruption of the order of two hundred times may be secured by blowing the sulfur hexafluoride through an arc. In other words, by blowing sulfur hexafluoride through an arc, we are able to interrupt 20,000 times the amperage that can be interrupted by still air in a similar interrupter, both at the same voltage.

Fig. 2 is a graph showing the volt-ampere interruption characteristics of a three-inch long gap in still sulfur hexafluoride gas at zero power factor at different absolute pressures of the gas. The graph also shows a plain break interruption characteristic in still air at 1 and 13 atmospheres absolute pressures;

Fig. 3 is a plot of volt-ampere interruption test values for a "puffer" type of interrupter operated with one atmosphere pressure (absolute) of the sulfur hexafluoride gas, and a contact separation speed of appoximately 15 feet per second.

This breaker was first tested with sulfur hexafluoride maintained at one atmosphere arc chamber pressure, with the applied currents being approximately 2,000 amperes, and the voltage being increased in steps until failure occurred. In this series of tests the breaker interrupted satisfactorily at 22, 33 and 44 kilovolts, and finally failed to operate at 2030 amperes at 66 kilovolts. However, on reducing the current to 1580 amperes, two successful operations were obtained at 66 kilovolts. These and other tests are plotted in Figure 3.

Fig. 4 shows a critical volt-ampere interruption characteristic plot of tests made on a "puffer" interrupter at two atmospheres pressure of sulfur hexafluoride gas, and at a contact separation speed of approximately 15 feet per second. Under these conditions, a successful interruption was obtained at 3100 amperes at 90 kilovolts. This and other test values were obtained, as shown in Figure 4.

Fig. 5 shows a plot of the volt-ampere interrupting characteristics of a breaker of the "explosion-pot" type, wherein the movable contact was substantially ⅝ inch in diameter, the explosion chamber was substantially five inches in diameter and approximately nine inches long, and the orifice member was approximately 3¼ inches long and was substantially closed by the disposition of the movable contact therein in the closed position of the device. The sulfur hexafluoride gas was initially present at one atmosphere pressure and the contact separation speed was 17 feet per second. The figures next to the points are volts per microsecond rate of rise of the recovery voltage transient. These figures were actual measurements from oscillograms, except that the figures in parentheses have been estimated by extrapolation based on experience that it varies as the square root of the product of current multiplied by voltage.

This curve shows that even though the pressure in this interrupting device is self-generating, it operated successfully to interrupt electrical currents over a wide range of amperage and voltage. The arcing time in the low current range varied from 1 to 3.5 half cycles of 60 cycle current. Contact separation at which successful interruption occurred varied from 0.48 to 4.6 inches. The phenomenal arc interrupting characteristics of the sulfur hexafluoride gas is evident from the tests plotted in Fig. 5.

Fig. 6 is a volt-ampere plot of an "explosion-pot" type of interrupter with the sulfur hexafluoride gas being maintained therein at two atmospheres pressure, and with a contact separation speed of approximately 17 feet per second. For purposes of comparison there is also provided on the same graph a curve of volt-ampere circuit interrupting limits of a six inch plain break arc in the sulfur hexafluoride gas, that is, without any forced gas flow. These curves indicate the very substantial improvement in arc interrupting characteristics obtained with the "explosion-pot" type of circuit interrupter as compared to a six inch plain break arc in still sulfur hexafluoride gas, the latter curve still indicative of outstanding arc interruption characteristics.

It is to be noted that, as indicated in both curves of Figs. 5 and 6, increasing the short circuit current will reduce the maximum voltage at which a circuit can be interrupted. Thus, points below and to the left of the curves may successfully be interrupted, whereas points falling above and to the right of the curves are above the capacity of the breaker. In other words, these curves show the critical volt-ampere interrupting characteristics of the "explosion-pot" type of breaker containing sulfur hexafluoride.

Fig. 7 is a volt-ampere plot of the characteristics of an "explosion-pot" type of interrupter with the sulfur hexafluoride gas being maintained therein at one, two and three atmospheres static pressure. These curves illustrate that an increase in absolute pressure will move the critical volt-ampere curves upwardly and to the right, thereby the interrupting capacity increases with the pressure of the applied sulfur hexafluoride.

In order to summarize the established improvements of the present invention, the following table is presented. As a basis for comparison, the current interrupting ability of a 3 inch long arc in air is rated as unity:

| Type of Arc | Interrupting Ability |
| --- | --- |
| 3 inch long arc in air (plain break) | 1 |
| 3 inch long arc in sulfur hexafluoride (plain break) | 100 |
| Puffer in air | 500 |
| Puffer in sulfur hexafluoride | 20,000 |

Since flow type interrupters in sulfur hexafluoride atmospheres can interrupt arcs at extremely high voltages at one atmosphere pressure or even less, it is not necessary to maintain high gas pressures in flow type interrupters with this gas, whereas, with air, high gas pressures are necessary. However, considerable improvement in current interrupting ability is obtained when the sulfur hexafluoride is maintained at pressures above atmospheric. The voltage interrupting ability goes up, for the same current, approximately directly with the absolute pressure.

Gas deterioration due to arcing has been found to be negligible. Mass spectrograph analyses have failed to show appreciable changes in gas composition even after long periods of high current arcing in small quantities of gas. Some metal fluorides are formed by combination with the vaporized metal of the contacts, but these metal fluorides prove to be soft powders which are very good insulators. However, the contact resistance does not increase appreciably since the metal fluorides do not adhere to the contact surfaces. In a hermetically sealed breaker no change in sulfur hexafluoride gas pressure or in gas density could be measured after over 100 arcs at a current of 500 R. M. S. amperes were drawn to a length of 3 inches and allowed to arc for 5 half cycles each in a 5.5 liter sulphur hexafluoride gas volume. Also, no deterioration in interrupting efficiency was observed after long periods of arcing in the same gas. This indicates that hermetically sealed breakers filled with sulfur hexafluoride may be used for thousands of operations.

While we have secured the best results with an arc-interrupting gas composed of sulfur hexafluoride alone, small quantities of one or more other gases may be admixed therewith, over 50% of the gas preferably being sulfur hexafluoride. Examples of such added gases are air, nitrogen, hydrogen, argon, helium, and carbon dioxide.

As an example of the fact that certain gases may be admixed with sulfur hexafluoride with beneficial results, reference is directed to Fig. 8 of the drawings. Fig. 8 shows the interrupting performance of a mixture of 50% air and 50% sulfur hexafluoride at two voltages, namely 2,300 volts and 13,800 volts compared with the performance of 100% sulfur hexafluoride gas at 2,300 volts and 13,800 volts. The curve for 100% air at 2,300 volts is indicated. From these curves, it is apparent that even with air mixed in an equal amount with the sulfur hexafluoride gas, nevertheless beneficial results are obtained and the performance is considerably better than that with 100% air.

While the high dielectric strength of sulfur hexafluoride is a beneficial property, it is not the property of chief importance for alternating-current circuit interruption. Of chief importance for the quenching or extinction of an alternating-current arc is the ability of the conducting arc gas to lose its conductivity and recover its normal dielectric strength very rapidly as the arc current passes through a zero value. As compared with air, sulfur hexafluoride, for example, shows a characteristic rate of dielectric recovery more than one hundred times as great. In many circuit interrupting situations of great practical importance, this also means a possible hundred-fold increase in interrupted current magnitudes.

The reason or reasons for this extraordinarily rapid dielectric recovery of $SF_6$ and related gases have not been definitely determined. Based on what information we have, certain surmises and theoretical deductions can be made. The ability of an arc column to carry hundreds or thousands of amperes per square centimeter at voltage gradients of only tens or hundreds of volts per centimeter must be due to a plentiful supply both of free electrons to transmit the current and of positive ions to neutralize the space charge which would otherwise be produced by the electrons. This difference in function between electrons and positive ions results for their very great difference in mass and hence in mobility. Electrons have mobilities and hence velocities many hundreds of times those of the positive ions of most gases. In the absence of large voltage gradients in a highly ionized gas, the laws of electrostatics show that the average densities of positive and negative charge must be nearly equal, and hence that the number per unit volume of positive and negative singly charged particles must be nearly equal. Under this condition, it is clear that if the negative charge carriers are free electrons, these highly mobile electrons will carry all but a fraction of a percent of the current.

During the dielectric recovery period just after a current zero, the still ionized arc gas between relatively cool metallic electrodes almost instantly loses most of its conductance because of the formation at the electrodes of space charge sheaths where high gradients can exist with small current flow. In the usual case, these sheaths are very thin but absorb practically all of the immediately reapplied voltage. Because the sheaths are so thin, they can withstand only a few hundred total volts initially. Further dielectric recovery occurs only as the ion density diminishes in the nearly field free space outside the sheaths by diffusion and recombination, leading to growth of the sheath thickness for a given applied voltage. Electrostatic effects limit the rate of diffusion essentially to that of the more massive and slower moving positive ions. For long arc columns surrounded by cooler gas, diffusion simply aids deionization by permitting the ions and electrons to reach the cooler boundary regions where recombination is easier. Recombination occurs at a usefully rapid rate only between positive and negative ions with comparable masses. Hence, an essential first step in the process is capture of the electrons by neutral molecules or atoms to form negative ions. This electron capture is generally considered to be impossible at atmospheric arc temperatures, occurring in the cooler boundary regions only. Here it is still probably the process which limits the rate of recombination.

Against this briefly sketched background of conventional theory, a possible explanation for the hundredfold increase in rate of dielectric recovery for arc spaces in $SF_6$ may be seen. Sulfur hexafluoride apparently has an exceptionally high affinity for electrons, being highly "electronegative." Comparatively little is known about this unusual tendency of the sulfur hexafluoride to absorb electrons and form negative ions, which tendency is far higher, easily 100 times or more, than exhibited by ordinary gases like oxygen which by itself furnishes most of the negative ions formed in air. That this attachment process is apparently the "bottleneck" in the recombination process leading to voltage recovery is well illustrated by the case of pure nitrogen gas, which though a slightly better insulator than air, is a very much poorer arc-extinguishing medium, exhibiting very slow dielectric recovery. In correlation with this, nitrogen is one of the gases which fails to form negative ions. Because this attachment process is so important, it is not unreasonable to expect that sulfur hexafluoride with exceptionally high electron affinity should have exceptionally high rates of dielectric recovery.

According to our theory regarding the behavior of sulfur hexafluoride, accelerated recombination, which can also affect ion density gradients and so rates of diffusion, should accelerate the growth of the space charge sheaths at the electrodes and thereby accelerate overall dielectric recovery of an ionized arc space between metallic electrodes. However, a still further effect is possible if it be presumed that electron attachment can occur within the arc core itself at temperatures only slightly below the arc burning temperature. If all of the free electrons within the arc core should quickly become attached to form relatively immobile ions, the conductivity of this much larger region would be reduced to the same order as that of the space charge sheaths, and hence large voltage gradients could also exist in this region even at the small space-charge-limited currents, again without the space being completely deionized. Such gradients, existing over comparatively large distances, could easily account for most of the very rapid dielectric recovery by arc spaces of considerable length in these gases.

It is apparent that this rapid recovery of dielectric strength is essentially a different effect from the elevation in static dielectric strength of sulfur hexafluoride in the initially un-ionized state, and that sulfur hexafluoride therefore performs an essentially different function in aiding the extinction of an alternating-current arc from that of mere improvement in insulation.

Although we have shown and described a particular structure in combination with a particular gas, it is to be clearly understood that the same was merely for the purpose of illustration, and that changes and modifications may readily be made therein without departing from the spirit and scope of the appended claims.

We claim as our invention:

1. A circuit interrupter including an enclosure containing a substantial proportion of sulfur hexafluoride gas, means for establishing a pair of serially related arcs, impedance means shunting one of the arcs to assist in the extinction of said arc, and the residual current arc being extinguished at the other break in the circuit by the sulfur hexafluoride gas.

2. A circuit interrupter including enclosure means containing a substantial proportion of sulfur hexafluoride gas, means for establishing a pair of serially related arcs, capacitance means shunting one of the arcs to assist in the extinction of said arc, and the residual current arc being extinguished at the other break in the circuit by the sulfur hexafluoride gas.

3. A circuit interrupter including enclosure means containing a substantial proportion of sulfur hexafluoride gas, means for establishing a pair of serially related arcs, resistance means shunting one of the arcs to assist in the extinction of said arc, and the residual current arc being extinguished at the other break in the circuit by the sulfur hexafluoride gas.

4. A circuit interrupter including enclosure means containing a substantial proportion of sulfur hexafluoride gas, means for establishing a pair of serially related arcs, capacitance and resistance means in parallel shunting one of the arcs to assist in the extinction of said arc, and the residual current arc being extinguished at the other break in the circuit by the sulfur hexafluoride gas.

5. A circuit interrupter including enclosure means containing a substantial proportion of sulfur hexafluoride gas, a relatively stationary contact, an intermediate contact and a cooperating movable contact, means biasing said intermediate contact away from said relatively stationary contact in the direction of opening movement of said movable contact, impedance means shunting the relatively stationary and intermediate contacts to assist in the extinction of the arc drawn therebetween, and the residual current arc being extinguished between the movable and intermediate contacts by the sulfur hexafluoride gas to effect interruption of the connected circuit.

6. A circuit interrupter including enclosure means containing a substantial proportion of sulfur hexafluoride gas, a relatively stationary contact, an intermediate contact and a cooperating movable contact, means biasing said intermediate contact away from said relatively stationary contact in the direction of opening movement of said movable contact, capacitance means shunting the relatively stationary and intermediate contacts to assist in the extinction of the arc drawn therebetween, and the residual current arc being extinguished between the movable and intermediate contacts by the sulfur hexafluoride gas to effect interruption of the connected circuit.

7. A circuit interrupter including enclosure means containing a substantial proportion of sulfur hexafluoride gas, a relatively stationary contact, an intermediate contact and a cooperating movable contact, means biasing said intermediate contact away from said relatively stationary contact in the direction of opening movement of said movable contact, resistance means shunting the relatively stationary and intermediate contacts to assist in the extinction of the arc drawn therebetween, and the residual current arc being extinguished between the movable and intermediate contacts by the sulfur hexafluoride gas to effect interruption of the connected circuit.

8. A circuit interrupter including enclosure means containing a substantial proportion of sulfur hexafluoride gas, a relatively stationary contact, an intermediate contact and a cooperating movable contact, means biasing said intermediate contact away from said relatively stationary contact in the direction of opening movement of said movable contact, resistance and capacitance means in parallel shunting the relatively stationary and intermediate contacts to assist in the extinction of the arc drawn therebetween, and the residual current arc being extinguished between the movable and intermediate contacts by the sulfur hexafluoride gas to effect interruption of the connected circuit.

9. A circuit interrupter including enclosure means containing a substantial proportion of sulfur hexafluoride gas, means for establishing a pair of serially related arcs, impedance means shunting one of the arcs to assist in the extinction of said arc, at least some sulfur hexafluoride gas being disposed adjacent said impedance shunted arc to facilitate its extinction, and the residual current arc being extinguished at the other break in the circuit by the sulfur hexafluoride gas.

10. A circuit interrupter including enclosure means containing a substantial proportion of sulfur hexafluoride gas, means for establishing a pair of serially related arcs, impedance means shunting one of the arcs to assist in the extinction of said arc, at least some sulfur hexafluoride gas being disposed adjacent said impedance shunted arc to facilitate its extinction, and the residual current arc being extinguished at the other break in the circuit to interrupt the circuit.

No references cited.